United States Patent [19]

Tirfing et al.

[11] Patent Number: 5,117,349
[45] Date of Patent: May 26, 1992

[54] USER EXTENSIBLE, LANGUAGE SENSITIVE DATABASE SYSTEM

[75] Inventors: Soren J. Tirfing, Palo Alto; Wayne C. Gramlich, Sunnyvale, both of Calif.

[73] Assignee: Sun Microsystems, Inc., Mountain View, Calif.

[21] Appl. No.: 500,138

[22] Filed: Mar. 27, 1990

[51] Int. Cl.5 .............................................. G06F 15/40
[52] U.S. Cl. ..................... 395/600; 364/282.3; 364/283.1; 364/280.4; 364/259.2; 364/DIG. 1
[58] Field of Search ... 364/200 MS File, 900 MS File

[56] References Cited

U.S. PATENT DOCUMENTS

| | | | |
|---|---|---|---|
| 4,384,325 | 5/1983 | Slechta, Jr. et al. | 364/200 |
| 4,774,655 | 9/1988 | Kollin et al. | 364/200 |
| 4,791,561 | 12/1988 | Huber | 364/200 |
| 4,931,928 | 6/1990 | Greenfeld | 364/200 |

Primary Examiner—Thomas M. Heckler
Attorney, Agent, or Firm—Blakely, Sokoloff, Taylor & Zafman

[57] ABSTRACT

A database system for text files is employed which comprises a compiler which receives as input a description of the source file types or languages and search filter and outputs a tag set definition file and filter file to be used by the browsing mechanism. The tags set definition file is input to the database builder mechanism and is used by the database builder to select and translate the information from the input source file to a database component file. Thus, by providing a description of the source file type, any type of source file in any language can be input to the database system of the present invention to generate a database component file which may be subsequently reviewed and searched by the same browsing mechanism.

7 Claims, 14 Drawing Sheets

```
 1:   version 1
 2:
 3:   language lang1
 4:   version 2
 5:
 6:   properties lang1 {
 7:         word
 8:         first
 9:         not_first
10:   }
11:
12:
13:   tags lang1 4 {
14:         first_on_line = (word first)
15:         not_first_on_line = (word not_first)
16:   }
17:   filter {
18:         "All Matches" = (word)
19:         "First" = (word first)
20:         "Not First" = (word not_first)
21:   }
22:
23:
24:   language lang2
25:   version 3
26:
27:   properties lang2 {
28:         word
29:         capitalized
30:         not_capitalized
31:   }
32:
33:
34:   tags lang2 4 {
35:         capitalized_word = (word capitalized)
36:         not_capitalized_word = (word not_capitalized)
37:   }
38:
39:   filter {
40:         "All Words" equiv lang1 "All Matches" = (word)
41:         "Capitalized" = (word capitalized)
42:         "Not Capitalized" = (word not_capitalized)
43:   }
```

Fig. 4

```
    Dump of sun_source_browser.ex
++++ Section ('Header' language='All languages' start=0 length=264)
Magic number = 0x3c65783e '<ex>'
Version number = 11
Section count = 8
Section #0 ('Header' language='All languages' start=0 length=264)
Section #1 ('Languages' language='All languages' start=264 length=44)
Section #2 ('Weight' language='lang1' start=308 length=8)
Section #3 ('Weight' language='lang2' start=316 length=8)
Section #4 ('Filter/Menu' language='All languages' start=324 length=230)
Section #5 ('Tags' language='lang1' start=556 length=95)
Section #6 ('Tags' language='lang2' start=652 length=101)
Section #7 ('Release section' language='' start=756 length=50)
++++ Section ('Languages' language='All languages' start=264 length=44)
0: 'lang1' version=1,2
1: 'lang2' version=1,3
++++ Section ('Weight' language='lang1' start=308 length=8)
Reported as part of the tags section
++++ Section ('Weight' language='lang2' start=316 length=8)
Reported as part of the tags section
++++ Section ('Filter/Menu' language='All languages' start=324 length=230)
324: ++++ Filter/Menu
328:   Pullright offset = 0
336:     'lang1' 'All Matches' '' [ lang1_first_on_line:1 lang1_not_first_on_line:1 ]
356:     'lang2' 'All Words' '' [ lang2_capitalized_word:1 lang2_not_capitalized_word:1 ]
376:   Pullright offset = 0
384:     'lang1' 'First' '' [ lang1_first_on_line:1 ]
404:   Pullright offset = 0
412:     'lang1' 'Not First' '' [ lang1_not_first_on_line:1 ]
432:   Pullright offset = 0
440:     'lang2' 'Capitalized' '' [ lang2_capitalized_word:1 ]
460:   Pullright offset = 0
468:     'lang2' 'Not Capitalized' '' [ lang2_not_capitalized_word:1 ]
++++ Section ('Tags' language='lang1' start=556 length=95)
0:
1: cb_lang1_first_on_line weight=64
2: cb_lang1_not_first_on_line weight=64
3: cb_lang1_lang1_fill_3 weight=64
4: cb_lang1_lang1_fill_4 weight=64
++++ Section ('Tags' language='lang2' start=652 length=101)
0:
1: cb_lang2_capitalized_word weight=64
2: cb_lang2_not_capitalized_word weight=64
3: cb_lang2_lang2_fill_3 weight=64
4: cb_lang2_lang2_fill_4 weight=64
++++ Section ('Release section' language='' start=756 length=50)
Release '@(#)RELEASE SC1.0  SourceBrowser 1.1alpha 90/03/02'
```

```
enum Cb_lang1_tags_tag {
        cb_lang1_tags_first_member = 0, cb_lang1_first_on_line = 1,
        cb_lang1_not_first_on_line = 2,
        cb_lang1_lang1_fill_3 = 3,
        cb_lang1_lang1_fill_4 = 4, cb_lang1_tags_last_member = 5
};
```

Fig. 8a

```
enum Cb_lang2_tags_tag {
        cb_lang2_tags_first_member = 0, cb_lang2_capitalized_word = 1,
        cb_lang2_not_capitalized_word = 2,
        cb_lang2_lang2_fill_3 = 3,
        cb_lang2_lang2_fill_4 = 4, cb_lang2_tags_last_member = 5
};
```

Fig. 8b

We, the people of the United States, in order to form a more perfect Union, establish justice, insure domestic tranquility, provide for the common defense, promote the general welfare, and secure the blessings of liberty to ourselves and our posterity, do ordain and establish this Constitution for the United States of America.

FIG. 9a

```c
/*
 * Short program to show how a simple collector works
 */ include <stdio.h>
include <ctype.h>
#include "cb_lang1_tags.h"
#include "cb_enter.h"

char    *cb_program_name = "lang1";

void
main(argc, argv)
    int     argc;
    char    *argv[];
{
    FILE        *in;
    char        word[1000];
    char        *p = word;
    int         chr;
    int         doing_word;
    int         lineno = 1;
    Cb_lang1_tags   tag = cb_lang1_first_on_line;

if ((argc != 2) || ((in = fopen(argv[1], "r")) == NULL)) {
        exit(1);   /* Could not open infile */
    } cb_enter_start(&lineno,     /* Init collector support package */
            CB_CURRENT_LANGUAGE,
            CB_CURRENT_MAJOR_VERSION,
            CB_CURRENT_MINOR_VERSION);
    cb_enter_push_file(argv[1], 1);  /* Start collecting for file */ while ((chr = getc(in)) != EOF) {
        if (isspace(chr)) {
            if (doing_word) {
                *p = 0;
                /*
                 * Collect one symbol
                 */
                cb_enter_symbol(word, lineno, tag);
                p = word;
                tag = cb_lang1_not_first_on_line;
                doing_word = 0;
            }
            if (chr == '\n') {
                tag = cb_lang1_first_on_line;
                lineno++;
            }
            continue;
        }
        doing_word = 1;
        *p++ = chr;
    }
    cb_enter_pop_file();   /* End collection and create database file */
}
```

Fig. 9b

```
++++ Header section (id=1, start=0, length=136)
Magic number = 0x3c636236 '<cb>'
.bd format version number = 2,1
#line seen in source = 0
case was folded = 0
Language: 'lang1' - version 1,2
Source type = root = 1
Number of sections = 5
Header section (id=1, start=0, length=136)
Source name section (id=2, start=136, length=48)
Symbol table section (id=4, start=184, length=812)
Semantic table section (id=5, start=996, length=412)
Release section (id=7, start=1408, length=50)
++++ Source name section (id=2, start=136, length=48)
relative=1 /home/jacomo/soren/sb/patent/example.lang1
++++ Symbol table section (id=4, start=184, length=812)
184: 'N #a95/example.lang1' offset = 996
216: 'do' offset = 1004
228: 'for' offset = 1012
240: 'ordain' offset = 1024
256: 'to' offset = 1032
268: 'AI example.lango #a95/example.lang1' offset = 1044
312: 'domestic' offset = 1052
328: 'ourselves' offset = 1060
348: 'a' offset = 1068
360: 'liberty' offset = 1076
376: 'the' offset = 1084
388: 'P #a95/example.lang1' offset = 1112
420: 'more' offset = 1120
432: 'form' offset = 1128
444: 'provide' offset = 1136
460: 'States' offset = 1144
476: 'tranquility,' offset = 1152
496: 'promote' offset = 1160
512: 'F S /home/jacomo/soren/sb/patent/example.lang1 0 .' offset = 1168
572: 'States,' offset = 1176
588: 'F G lang1 0 .' offset = 1184
612: 'Union,' offset = 1192
628: 'this' offset = 1200
640: 'people' offset = 1208
656: 'posterity,' offset = 1216
676: 'secure' offset = 1224
692: 'United' offset = 1232
708: 'N example.lango' offset = 1244
732: 'insure' offset = 1252
748: 'general' offset = 1260
764: 'America.' offset = 1268
780: 'perfect' offset = 1276
796: 'common' offset = 1284
812: 'defense,' offset = 1292
828: 'justice,' offset = 1300
844: 'welfare,' offset = 1308
860: 'We,' offset = 1316
872: 'establish' offset = 1324
892: 'our' offset = 1336
```

Fig. 9c (1 of 3 pages)

```
904: 'order' offset = 1344
920: 'and' offset = 1352
932: 'in' offset = 1368
944: 'of' offset = 1376
956: 'Constitution' offset = 1392
976: 'blessings' offset = 1400
++++ Semantic table section (id=5, start=996, length=412)
996: Symbol on line 1: 'N #a95/example.lang1' <Unknown tag> = 72
1000: End record
1004: Symbol on line 4: 'do' cb_lang1_not_first_on_line = 2
1008: End record
1012: Symbol on line 2: 'for' cb_lang1_not_first_on_line = 2
1016: Symbol on line 4: 'for' cb_lang1_not_first_on_line = 2
1020: End record
1024: Symbol on line 4: 'ordain' cb_lang1_not_first_on_line = 2
1028: End record
1032: Symbol on line 1: 'to' cb_lang1_not_first_on_line = 2
1036: Symbol on line 3: 'to' cb_lang1_not_first_on_line = 2
1040: End record
1044: Symbol on line 1: 'AI example.lango #a95/example.lang1' <Unknown tag> = 66
1048: End record
1052: Symbol on line 2: 'domestic' cb_lang1_not_first_on_line = 2
1056: End record
1060: Symbol on line 4: 'ourselves' cb_lang1_first_on_line = 1
1064: End record
1068: Symbol on line 1: 'a' cb_lang1_not_first_on_line = 2
1072: End record
1076: Symbol on line 3: 'liberty' cb_lang1_not_first_on_line = 2
1080: End record
1084: Symbol on line 1: 'the' cb_lang1_not_first_on_line = 2
1088: Symbol on line 1: 'the' cb_lang1_not_first_on_line = 2
1092: Symbol on line 2: 'the' cb_lang1_not_first_on_line = 2
1096: Symbol on line 3: 'the' cb_lang1_not_first_on_line = 2
1100: Symbol on line 3: 'the' cb_lang1_not_first_on_line = 2
1104: Symbol on line 5: 'the' cb_lang1_first_on_line = 1
1108: End record
1112: Symbol on line 1: 'P #a95/example.lang1' <Unknown tag> = 73
1116: End record
1120: Symbol on line 1: 'more' cb_lang1_not_first_on_line = 2
1124: End record
1128: Symbol on line 1: 'form' cb_lang1_not_first_on_line = 2
1132: End record
1136: Symbol on line 2: 'provide' cb_lang1_not_first_on_line = 2
1140: End record
1144: Symbol on line 5: 'States' cb_lang1_not_first_on_line = 2
1148: End record
1152: Symbol on line 2: 'tranquility,' cb_lang1_not_first_on_line = 2
1156: End record
1160: Symbol on line 3: 'promote' cb_lang1_not_first_on_line = 2
1164: End record
1168: Symbol on line 1: 'F S /home/jacomo/soren/sb/patent/example.lang1 0 .' <Unknown tag> = 23
1172: End record
1176: Symbol on line 1: 'States,' cb_lang1_not_first_on_line = 2
1180: End record
1184: Symbol on line 1: 'F G lang1 0 .' <Unknown tag> = 30
```

Fig. 9c (2 of 3 pages)

```
1188: End record
1192: Symbol on line 1: 'Union,' cb_lang1_not_first_on_line = 2
1196: End record
1200: Symbol on line 4: 'this' cb_lang1_not_first_on_line = 2
1204: End record
1208: Symbol on line 1: 'people' cb_lang1_not_first_on_line = 2
1212: End record
1216: Symbol on line 4: 'posterity,' cb_lang1_not_first_on_line = 2
1220: End record
1224: Symbol on line 3: 'secure' cb_lang1_not_first_on_line = 2
1228: End record
1232: Symbol on line 1: 'United' cb_lang1_not_first_on_line = 2
1236: Symbol on line 5: 'United' cb_lang1_not_first_on_line = 2
1240: End record
1244: Symbol on line 1: 'N example.lango' <Unknown tag> = 71
1248: End record
1252: Symbol on line 2: 'insure' cb_lang1_not_first_on_line = 2
1256: End record
1260: Symbol on line 3: 'general' cb_lang1_not_first_on_line = 2
1264: End record
1268: Symbol on line 5: 'America.' cb_lang1_not_first_on_line = 2
1272: End record
1276: Symbol on line 1: 'perfect' cb_lang1_not_first_on_line = 2
1280: End record
1284: Symbol on line 2: 'common' cb_lang1_not_first_on_line = 2
1288: End record
1292: Symbol on line 3: 'defense,' cb_lang1_first_on_line = 1
1296: End record
1300: Symbol on line 2: 'justice,' cb_lang1_not_first_on_line = 2
1304: End record
1308: Symbol on line 3: 'welfare,' cb_lang1_not_first_on_line = 2
1312: End record
1316: Symbol on line 1: 'We,' cb_lang1_first_on_line = 1
1320: End record
1324: Symbol on line 2: 'establish' cb_lang1_first_on_line = 1
1328: Symbol on line 4: 'establish' cb_lang1_not_first_on_line = 2
1332: End record
1336: Symbol on line 4: 'our' cb_lang1_not_first_on_line = 2
1340: End record
1344: Symbol on line 1: 'order' cb_lang1_not_first_on_line = 2
1348: End record
1352: Symbol on line 3: 'and' cb_lang1_not_first_on_line = 2
1356: Symbol on line 4: 'and' cb_lang1_not_first_on_line = 2
1360: Symbol on line 4: 'and' cb_lang1_not_first_on_line = 2
1364: End record
1368: Symbol on line 1: 'In' cb_lang1_not_first_on_line = 2
1372: End record
1376: Symbol on line 1: 'of' cb_lang1_not_first_on_line = 2
1380: Symbol on line 3: 'of' cb_lang1_not_first_on_line = 2
1384: Symbol on line 5: 'of' cb_lang1_not_first_on_line = 2
1388: End record
1392: Symbol on line 4: 'Constitution' cb_lang1_not_first_on_line = 2
1396: End record
1400: Symbol on line 3: 'blessings' cb_lang1_not_first_on_line = 2
1404: End record
++++ Release section (id=7, start=1408, length=50)
Release '@(#)RELEASE SC1.0SourceBrowser 1.1alpha  90/03/02'
```

Fig. 9c (3 of 3 pages)

USER EXTENSIBLE, LANGUAGE SENSITIVE DATABASE SYSTEM

BACKGROUND OF THE INVENTION

1. Field of the Invention

The method and apparatus of the present invention relates to the organization of databases. More specifically, the method and apparatus of the present invention relates to the generation of database files from source files of different types.

2. Related Application

This application is related to U.S. patent application Ser. No. 07/500,141 filed, Mar. 27, 1990, entitled "Method and Apparatus for Searching Database Component Files to Retrieve Information from Modified Files" and is herein incorporated by reference.

3. Art Background

A database is a collection of information which is organized and stored in a predetermined manner for subsequent search and retrieval. Typically, the data is organized in such a manner that the data is indexed according to certain parameters and can be retrieved according to those parameters. For example, a database may contain information to index words in the text file such that words or strings of words in the text file may be retrieved quickly. The data stored in the database structure may be organized in a single file or a multiplicity files for access and retrieval.

Typically the database file is organized according to the type of source file the database is generated from. For example, a database file for a source file which is the text of a book most likely would be different from a database derived from source code of a computer program. Similarly, the browsing mechanisms developed to search the databases would differ from source file type to source file type. Correspondingly, databases and the browsing mechanisms to search the databases vary according to the language of the source file.

In addition, with the constant appearance of new computing languages, it is extremely difficult to provide a database and browsing mechanism for each language. A solution to this problem is to provide a user-extensible database and browsing mechanism whereby a user can define the semantics of a language to the universal database and browsing mechanism. Once the semantics of the language are defined, a database can be built and searches can be performed.

SUMMARY OF THE INVENTION

It is therefore an object of the present invention to provide a database system which may be used for a variety of source file types and languages.

It is an object of the present invention to provide a database system comprising a user extensible database and browsing mechanism.

It is further an object of the present invention to provide an interface between a source file and the database system such that the same database generation mechanism may be used for a variety of source file types and the same browsing mechanism can be used to search the database component files generated.

A database system for text files is employed which comprises a compiler which receives as input a description of the source file types or languages and corresponding search filter and outputs a tag set definition file per language and a filter definition file to be used by the browsing mechanism. The tag set definition file is input to the database builder mechanism and is used by the database builder to select and translate the information from the input source file to the database component file. Thus, by providing a description of the source file type, any type of source file in any language can be input to the database system of the present invention to generate a database component file which may be subsequently reviewed and searched by the browsing mechanism.

BRIEF DESCRIPTION OF THE DRAWINGS

The objects, features and advantages of the database system of the present invention will be apparent from the following description of the present invention in which:

FIG. 4 is an illustrative source file type description.

FIG. 7 illustrates a filter file generated by the compiler for the source file type description.

FIG. 8a and 8b illustrate a tag set definition file generated by the compiler for the source file type description "lang1" and "lang2".

FIG. 9a illustrates a source file to be input to the database system of the present invention. FIG. 9b is an illustrative database builder and FIG. 9c illustrates a database component file generated by the database system of the present invention for the source file of FIG. 9a.

DETAILED DESCRIPTION OF THE INVENTION

Notation And Nomenclature

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method of operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

General System Configuration

Figure 1:
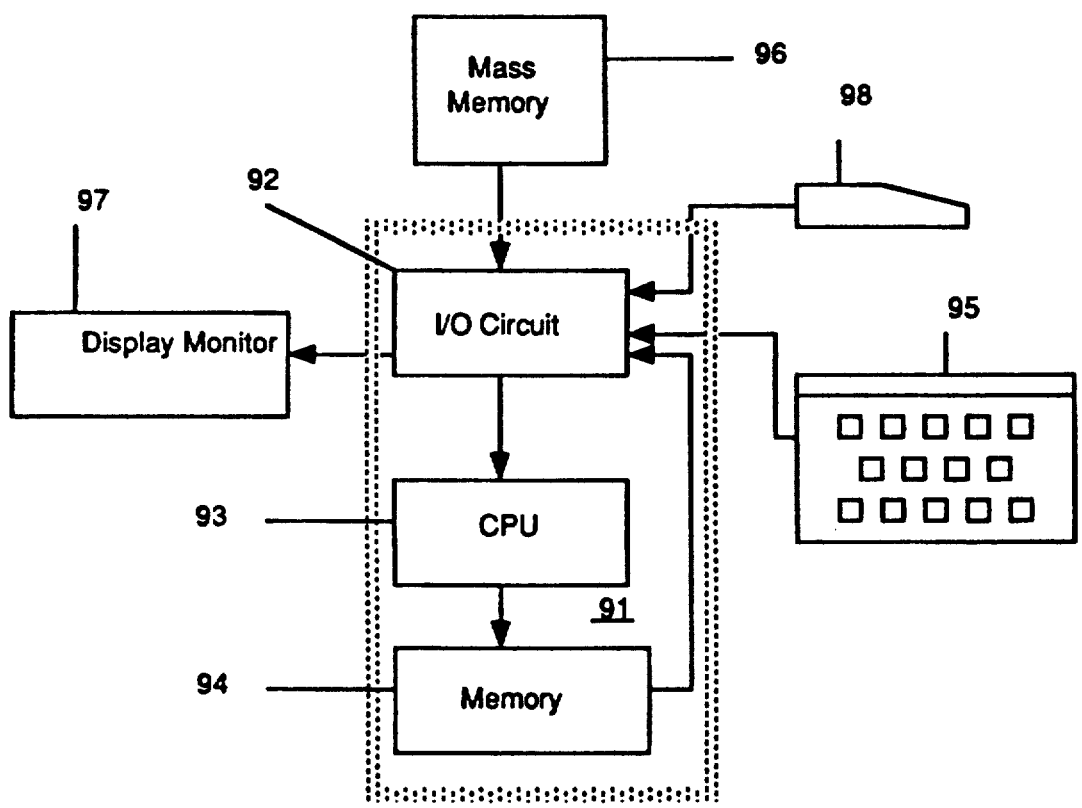
FIG. 1 is a block diagram representation of an illustrative computer system of the present invention.

FIG. 1 shows a typical computer-based system for the generation and searching of databases according to the present invention. Shown there is a computer 91 which comprises three major components. The first of these is the input/output (I/O) circuit 92 which is used to communicate information in appropriately structured form to and from the other parts of the computer 91. Also shown as a part of computer 91 is the central processing unit (CPU) 93 and memory 94. These latter two elements are those typically found in most general purpose computers and almost all special purpose computers. In fact, the several elements contained within computer 91 are intended to be representative of this broad category of data processors. Particular examples of suitable data processors to fill the role of computer 91 include machines manufactured by Sun Microsystems, Inc., Mountain View, California. Other computers having like capabilities may of course be adapted in a straightforward manner to perform the functions described below.

Also shown in FIG. 1 is an input device 95, shown in typical embodiment as a keyboard. It should be understood, however, that the input device may actually be a card reader, magnetic or paper tape reader, or other well-known input device (including, of course, another computer). A mass memory device 96 is coupled to the I/O circuit 92 and provides additional storage capability for the computer 91. The mass memory may include other programs and the like and may take the form of a magnetic or paper tape reader or other well known device. It will be appreciated that the data retained within mass memory 96, may, in appropriate cases, be incorporated in standard fashion into computer 91 as part of memory 94.

In addition, a display monitor 97 is illustrated which is used to display messages or other communications to the user. Such a display monitor may take the form of any of several well-known varieties of CRT displays. A cursor control 98 is used to select command modes and edit the input data, and in general provides a more convenient means to input information into the system.

Process Description

The user-extensible database system of the present invention includes a compiler and database builder. Database component files may be formed for different types of textual source files and the same browsing mechanism (also referred to as a "search mechanism") may be used for a variety of source file types or languages (hereinafter referred to collectively as "languages") such that the database browsing means is not limited to a particular language. For example, the same database can be used for a variety of computer programs which are in different programming languages. Similarly, database component files can be formed for a plurality of text materials such as books or articles which are written in a variety of languages as well as in a variety of styles and formats.

Figure 2:
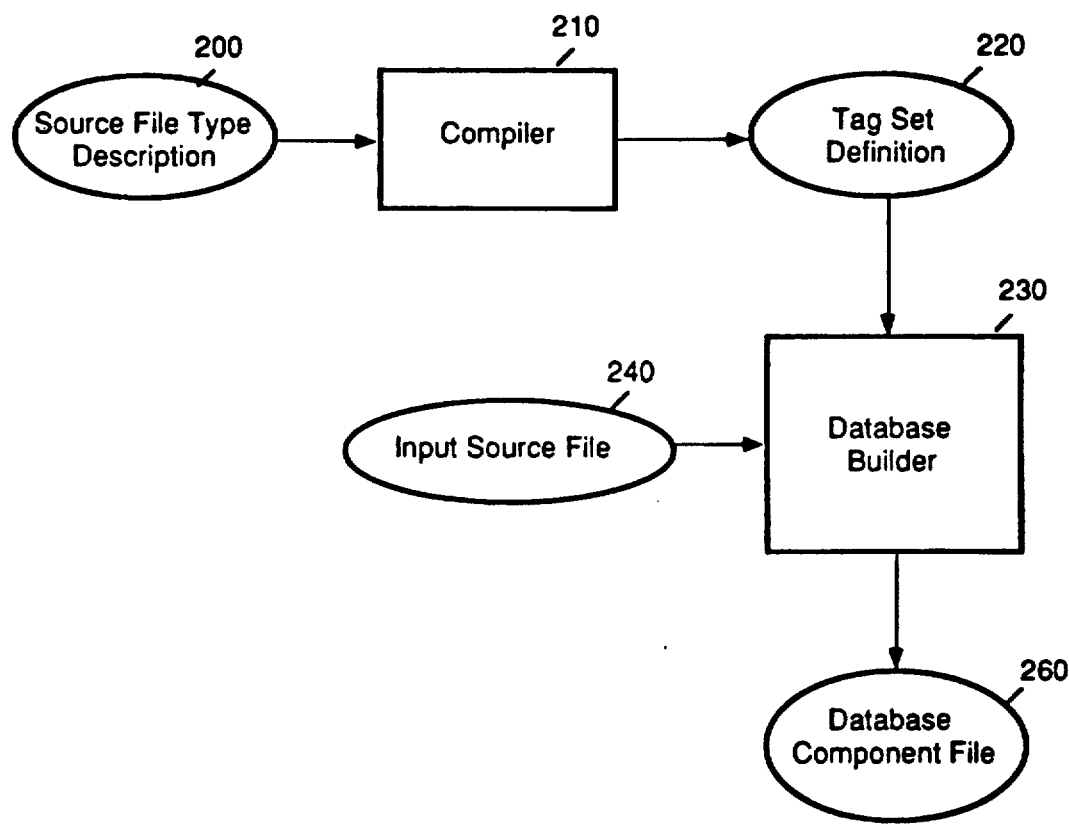
FIG. 2 is a functional block diagram of the database system of the present invention.

The system is illustrated by the functional block diagram of FIG. 2. A description of the source file language 200 (referred to as "source file type description") is input to a compiler 210 which generates a tag set definition 220 which is understandable by the database builder 230. To generate a database component file for an input source file, the tag set definition 220 is input to the database builder 230 along with the input source file 240. The database builder 230 uses the tag set definition and applies it to the input source file when extracting the symbol information and formatting the information to be stored in the database component file 260. The database component file 260 can be subsequently searched by a browsing mechanism to retrieve information relevant to the input source file.

The source file type description defines the language of the source file. The source file type description comprises a listing of semantic tag values that can be associated with symbols that are to be entered into the database. The source file type description optionally includes filter descriptions specifically tailored to the type of source file which permits the user to employ various filters when performing searches.

The semantic tags provide the means to classify portions of text of the source file and provide the means to use the same browsing and filtering mechanism for a multiplicity of source file types. The compiler uses the source file type description to generate a tag set definition file in a format understandable by the database builder 230. In addition, if filter descriptions are included in the source file type description, the compiler generates a filter file according to the semantic tags for the source file type which is referenced by the browsing mechanism to provide the user with filtering options when performing searches in the database for that source file language. Thus, the browsing mechanism is compatible with all database component files generated and modification of the browsing mechanism to search each particular source file language is avoided. To perform a search on a database component file, the query is input to the browsing mechanism identifying the symbol and a filter. The filter provides a means to narrow the query and provide a more precise search. For further information regarding the browsing mechanism, see co-pending patent application U.S. Ser. No. 07/500,141, filed, Mar. 27, 1990, entitled: "Method and Apparatus for Searching Database Component Files to Retrieve Information From Modified Files."

Figure 3A:
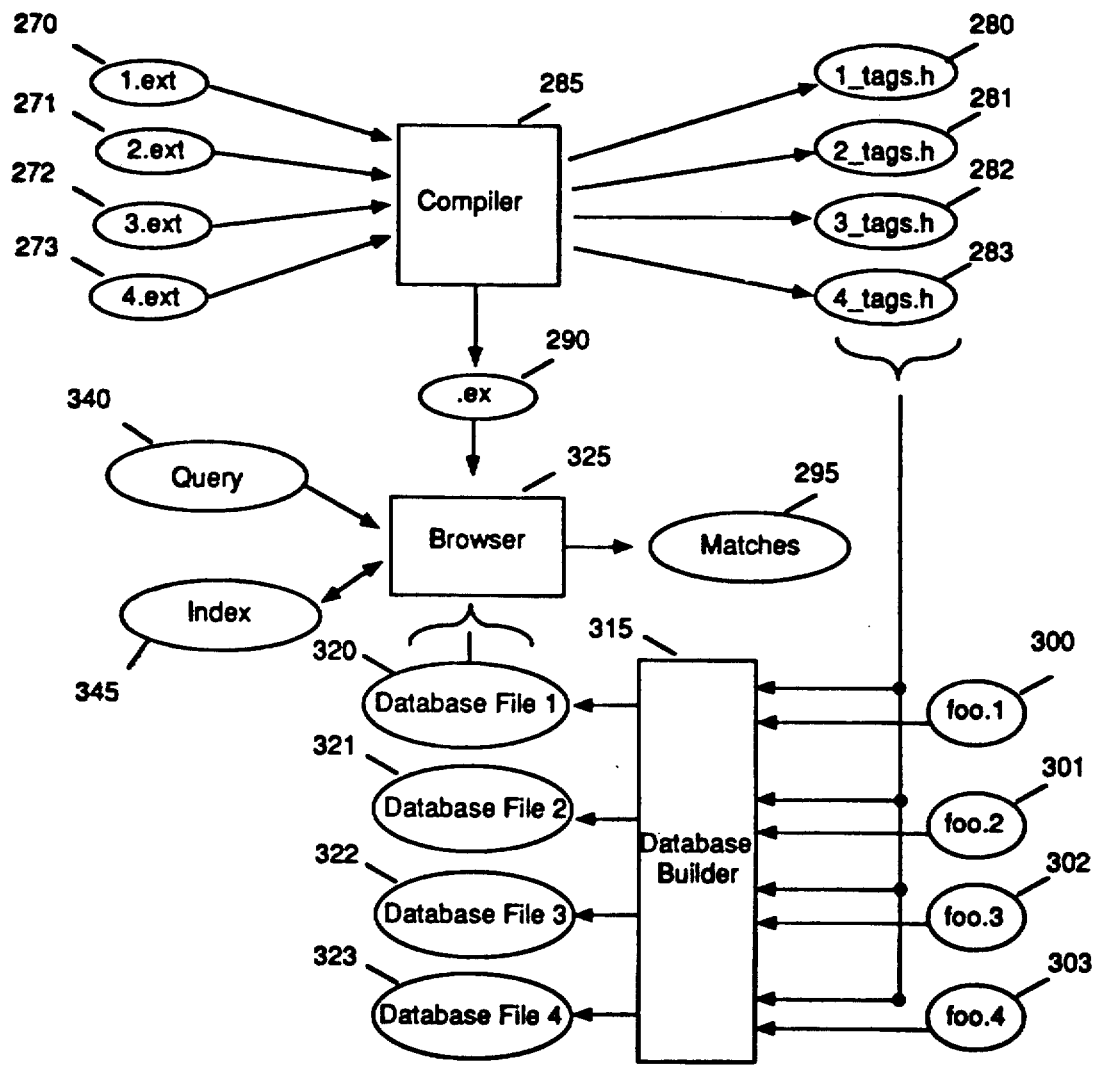
FIG. 3a and 3b are functional block diagram of preferred embodiments of the database system of the present invention.

Through the use of the database system of the present invention, source files written in a variety of languages may be input to the database builder to generate database component files which can be subsequently searched utilizing the same browsing mechanism. This is illustrated by FIG. 3a in which four input files, 300, 301, 302, 303, each written in a different language, may be input to the database builder 315 to generate database component files 320, 321, 322, 323 which are subsequently utilized by the browsing mechanism 325 to process a query 340 to generate the matches which are the result of the query 295. To decrease the amount of time required to perform a query, it is preferred that an index file 345 is generated for a database to provide an index of database component files each symbol is located in. The browsing mechanism utilizes the index file 345 to determine which database component files to search to find occurrences of a particular symbol.

The database builder 315 in this embodiment is a single mechanism which generates database component files for all language types. Preferably, the database builder will read the source file, extract the symbols contained in the source file, assign the corresponding semantic tag to the symbol according to a predetermined criteria (e.g. symbol type), and build a database component file identifying each symbol, the line number of the line where the symbol is located in the source file and the corresponding semantic tag. The database builder 315 may also be part of another mechanism which extracts the symbols from the source file whereby the database builder 315 utilizes the extracted symbol information provided to build the database component file. The capability to utilize the same browsing mechanism regardless of the language of the source file is provided through the compiler 285 which accepts as input the source file descriptions for each of the source file types 270, 271, 272, 273 and generates a tag set definition file for each source file type 280, 281, 282, 283. Optionally, filters for different source file languages can be specified in the source file type description and the compiler can generate a filter file (referred to herein as the "ex." file) 290 which is utilized by the browsing mechanism 325 to enable the user to direct the browsing mechanism to perform filtering functions on queries.

Figure 3B:
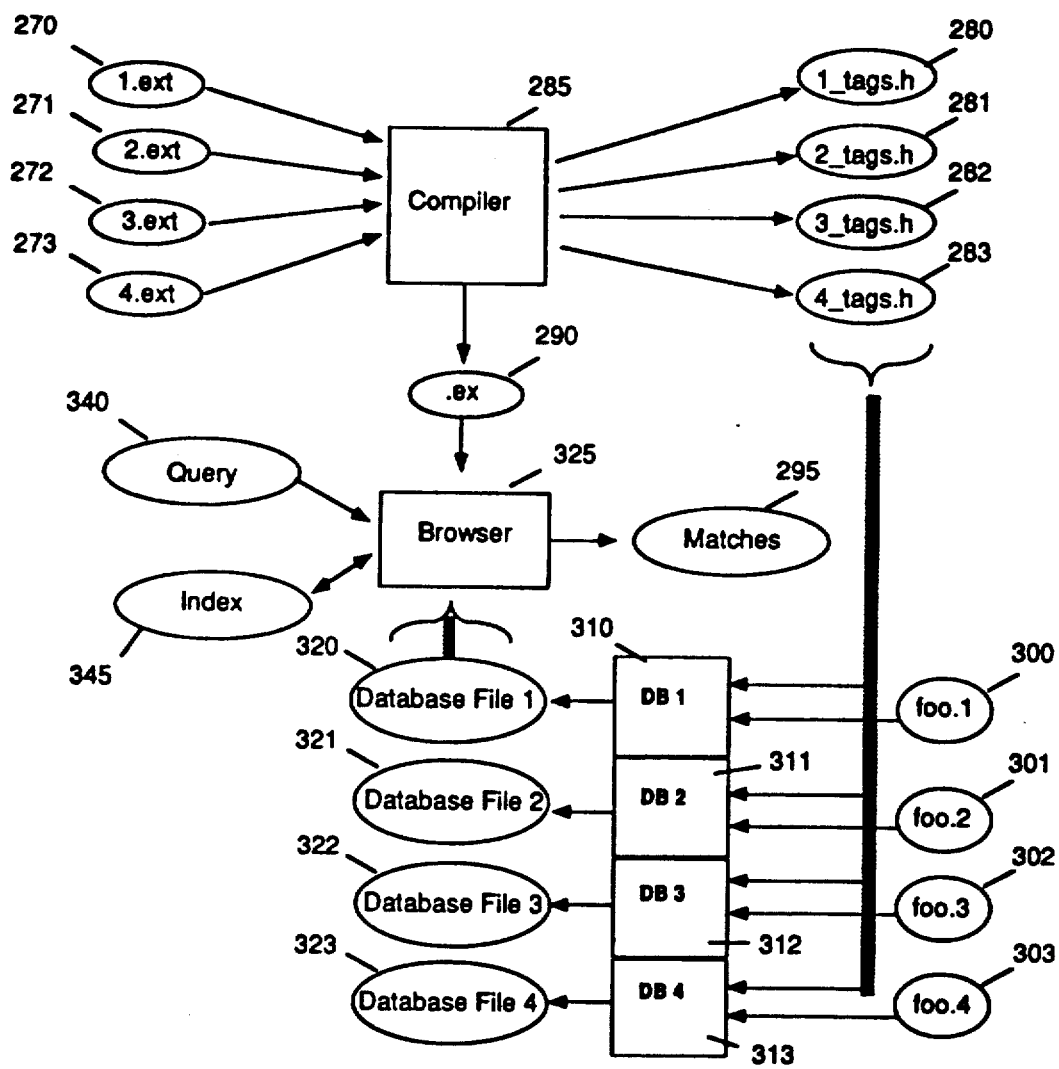

An alternative embodiment is illustrated in FIG. 3b. In this embodiment a separate database builder 310, 311, 312, 313 is provided for each language. For example, the source file "foo.1" 300 is input to the database builder 310 along with the tag set definition file 280 to generate the corresponding database component file. Similarly, source file "foo.2" 301 is input to the database builder 311 along with the corresponding tag set definition file 281 to generate the database component file 321.

This embodiment may be used when the database generator of the present invention is incorporated into a language specific process such as a computer program compiler or interpreter. The computer program compiler analyzes the source file (i.e., the computer program to be compiled) and generates object code for subsequent execution of the computer program. In its analysis of the source file, the computer program compiler identifies each symbol and symbol type used in the computer program. The database builder utilizes this information to identify the corresponding semantic tags and to generate the database component file comprising each identified symbol, the line number the symbol is located on in the source file and the corresponding semantic tag defined in the tag set definition file.

As briefly explained above, the source file description defines the semantic tags for symbols and their associated filters, all of which are source file type dependent. One source file description is provided for each source file type that is to be input through the database system of the present invention.

Referring to FIG. 4, a source file type description is described for theoretical languages "lang1" and "lang 2". The file is in the ASCII format; however, the database system of the present invention is not limited as such and can be implemented in other formats. The language "lang1" consists of two semantic tags, "first_on_line" and "not_first_on_line" which are respectively defined to be a word first in a line of text and a word not first in a line of text. The language "lang2" also consists of two semantic tags "capitalized_word" and "not_capitalized_word" which are respectively defined to be words that are capitalized and words not capitalized. At the beginning of the file (line 1) is a "version" statement which is of the form:

version-statement = 'version' <small integer>

The version statement takes an integer version number in the range of 1 to 32767. When the version statement is located in the file prior to the occurrence of a language statement (as is the version statement at line 1), the version number indicated is used to identify the version of the .ex file containing the filters and the tag set definition file being produced. If the version statement is located in the file after a language statement (as is the version statement at line 4), the version number is used to identify the version of the specific language.

Referring to FIG. 4, line 3 contains a "Language" statement. The Language statement is of the form:

language-statement: = 'language' <name>

The Language statement takes 1 argument. The argument, "name" is the name of the language the following statements describe. In the present illustration, the name of the language is "lang1". Similarly for the Language statement at line 24, the name of the language is "lang2".

Line numbers 6 through 9 illustrate a "Properties" statement. The Properties statement declares the properties of symbols and are used to associate semantic tags, as set forth in the "Tags" statement (lines 13 through 15), and filters, as set forth to in the "Filter" statement (lines 17 through 20). Each semantic tag has a list of properties that it defines and each filter item has one or more lists of properties that it matches. A filter item will match all tags that define all properties that the filter item references. The Properties statement is of the form:

property-statement: = 'properties' <prefix> '{' <-property-identifier> *'}'.

The first argument prefix, identifies the Properties statement. The second argument lists the actual properties. For example, the properties of lang1 are "word", "first" and "not_first" and the properties for lang2 are "word", "capitalized" and "not_capitalized".

The "Tags" statement at lines 13 through 15 define a list of semantic tags that the database builder is supposed to associate with symbols of lang1 in the database. The "Tags" statement is of the form:

```
tags-statement = 'tags' <prefix> <size> '-
   {'<tag>*'}'
``` where,

```
tag = <tag-identifier> ' = "(' <property
   identifier> *')'[<weight>]
```

The argument "prefix" is used to indicate the prefix tag statement to identify the statement. The "size" argument identifies the number of tags and is used to ensure each tag statement generates the same number of tags each time the compiler is executed. The argument "property identifier" is used to match filter items to semantic tags by associating the semantic tag with properties identified in the Properties statement. For example, the Tags statement for lang1 at line 13 through 15 includes the tag "first_on_line" having the properties "word" and "first" and the tag "not_first_on_line" having the properties "word" and "not_first". The argument "weight" associates an integer value with each tag which is used to sort matches in response to a query. Matches having the lighter weights are presented before matches of heavier weights.

FIG. 4, lines 17-20, sets forth a Filter statement for language lang1 and lines 39-42 set forth a Filter statement for the language lang2. The "Filter" statement defines a filter panel consisting of filter items and is of the form:

```
filter-statement = 'filter'{'<filter-item>*'}' filter-item = leaf-item | pull-right-item leaf-item = ""<filter-item-name> ""[<equiv-
   spec>]' = '<prop-lists> prop-lists = '('<property>*')'['|'"('<proper-
   ty>*')']* pull-right-item = ""<filter-item-name> ""[<equiv-
   spec>]'filter'{'<filter-item>*'}' equiv-spec = 'equiv' <language> ""<filter-item-
   name> ""
```

Figure 5A:
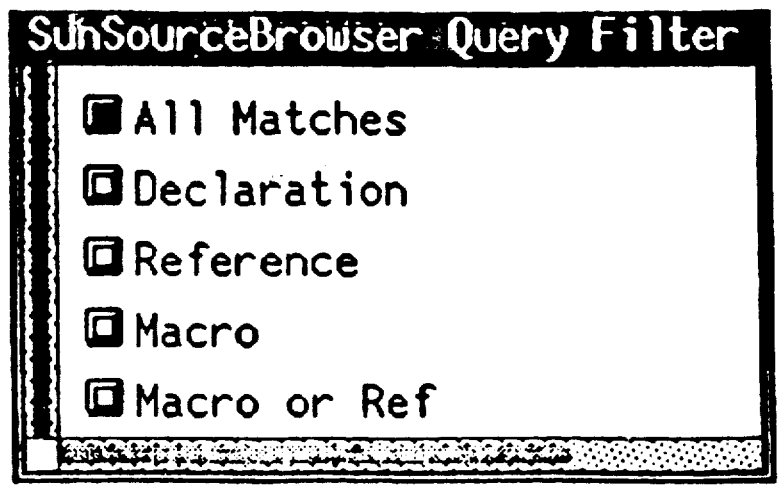
FIG. 5a and 5b are illustrative filter menus.
Figure 5B:
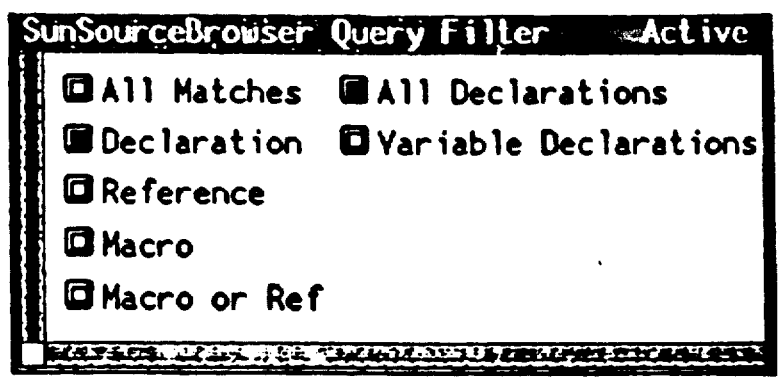

When a filter item is built, the properties identified with the filter item and all semantic tags are used to figure out the semantics tags the filter item should match. The filter, which is specified for a particular source type, permits the user to narrow the search based on the semantic tags of the symbols. Preferably the filter is implemented through a menu panel displayed to the user such as the one illustrated in FIG. 5a. Optionally, the filter panel may be expanded to include additional filter items which can be used to narrow a search. For example, FIG. 5b illustrates a filter panel expanded after selection of the filter item "Declaration".

The filter panel consists of a list of filter items. Each filter item defines a list of semantic tags that the filter should match. This is built from the property list ("prop-lists") of the filter items and the semantic tags. Each filter item is either a "leaf" item or a "pull-right" item. The leaf filter item specifies one or more properties that are used to identify the semantics tags the filter item should match in order to be considered to be matches when the browsing mechanism performs a search.

Pull-right filter items specify another filter statement which is displayed when a particular filter item defining a pull-right menu item is selected and inherit the set of tags to match from the first leaf item of its pull-right filter.

The association between tags and filter items is established according to the properties of a symbol. Each semantic tag has a list of properties that it defines and each filter items has one or more list of properties that it matches. A filter item will match all semantic tags that define all properties that the filter item references.

Thus, when a user selects a filter item from the filter items provided in the browsing mechanism through the .ex file, queries will be restricted to symbols with one of the tags the filter item specifies.

The Filter statement set forth at lines 17-20 defines three filter items "All Matches", "First" and "Not First". The first filter item is defined by the property "word". The second filter item "First", is defined by the properties "word" and "first". The third filter item "Not First" is defined by the properties "word" and "not_first". Thus, for example, if a search for is performed in a source input file written in the language lang1 and the filter item "First" is selected, the browsing mechanism will filter out all symbols except those identified by the semantic tag first_on_line.

The Filter statement at lines 39-42 define the filter items for the language lang2 at line 40, the filter item "All Words" is defined by the property "word". In addition, the filter item "all words" is also set to be equivalent to the filter item "All Matches" in lang1.

The "equiv" statement permits filters to be shared among different source file types. The equiv statement is of the form:

```
equiv-spec = 'equiv' <language> ""<filter-item-
   name> ""
```

The statement is used to indicate that the current filter item is equivalent to the specified filter item. Thus, to display the filter, the browsing mechanism simply utilizes the filter corresponding to the filter item specified. When filter items have been equivalenced, the browsing mechanism is required to keep track of the set of matching semantic tags for each language. To do this, the .ex file, the file generated by the compiler, contains a vector <language-id, filter item name, tag-vector> triples for each filter item. The browsing mechanism is then able to use the correct tag filter for the language of the source file because the database component file contains the name of the language it was generated from.

Thus, the filter item "All Words" utilizes the filter for "All Matches" in lang1. The browsing mechanism, when performing a query, for "All Matches" or "All Words" will also perform a query with respect to the other filter item.

Figure 6:
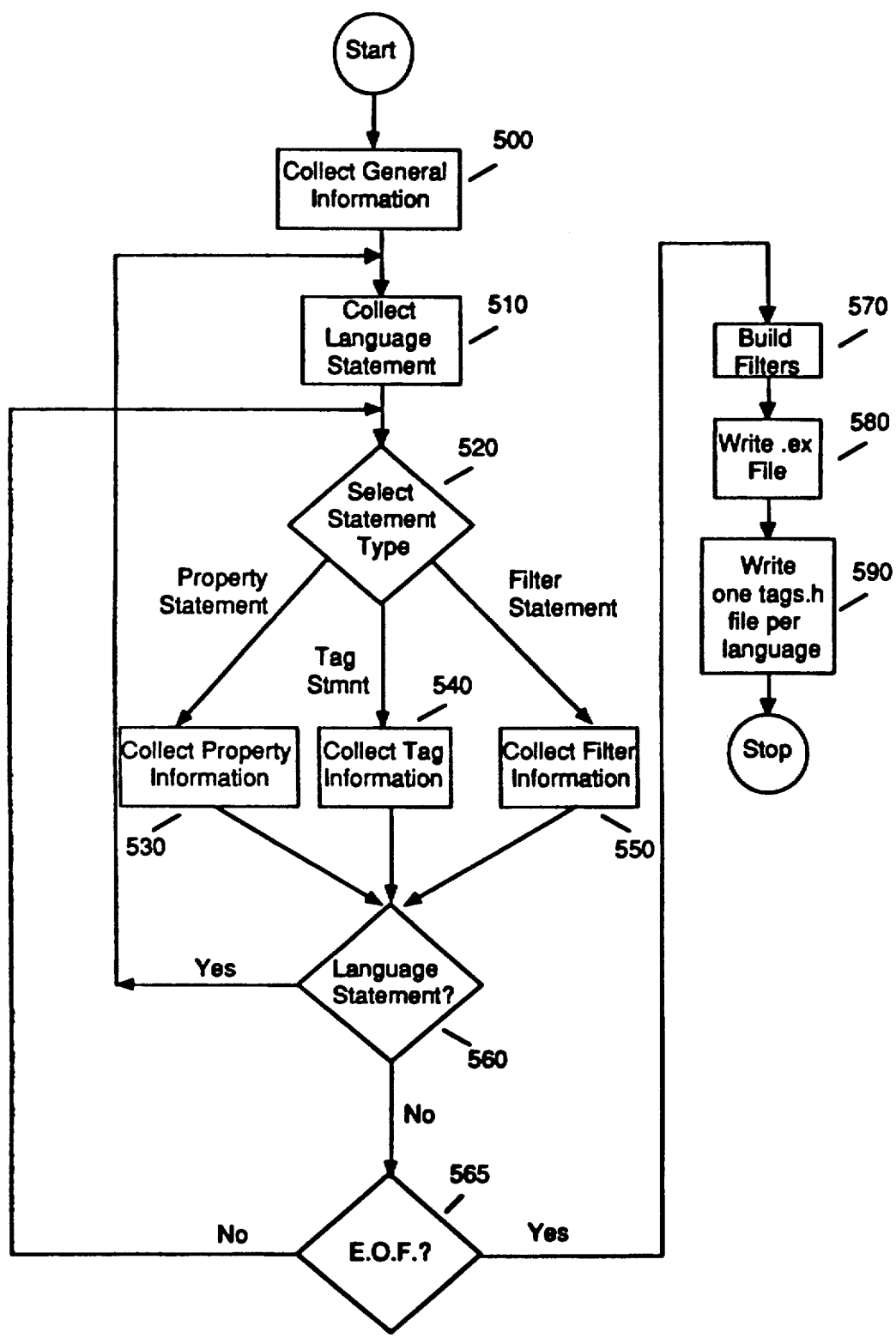
FIG. 6 is a flow chart of the compiler mechanism of the database system of the present invention.

Referring to FIG. 6, the process flow for the compiler is explained. From the source file description for the particular source file type, at block 500 the compiler collects general information regarding the source type description, such as the version number.

At block 510, the Language statement is collected from the source file type description to identify the name of the language for the source file type description. Each statement, at block 520, is examined to determine the type of statement e.g. Properties statement, Tag statement or Filter statement. If the statement type is a Properties statement, at block 530, the corresponding properties information in the statement is collected from the source file type description. If the statement type is a Tag statement, at block 540, the tag information is collected. Similarly, if the statement is a Filter statement, at block 550, the filter information is collected.

After collecting properties information, tags information and filter information, at block 560, if another language statement is found, the process continues for another source file type (more than one source file type description may be contained in a single file, as is illustrated by FIG. 4). If the next statement is not a language statement, the statement must be a Properties, Tag or Filter statement whereby processing continues at block 520 via block 565. If, at block 565, the end of the file is reached, the filters defined by the Filter statement(s) are built, block 570, and at block 580, are written into the Filter file (.ex file). At block 590, one tag set definition file is written per source file type description.

The .ex file generated for language lang1 defined by the source file type description of FIG. 4, is illustrated by FIG. 7. At the beginning of the .ex file is a header section 700 containing a listing and location of the sections forming the file. The language section 710 identifies the languages defined. The weight section, 715, 720 specifies the weights of the semantic tags for such language. Preferably, as is the case in the present illustration, the weights are identified in the tags section 740 and 750. The filter section 730, specifies the six filter items "All Matches", "All Words", "First", "Not First", "Capitalized" and "Not Capitalized". Each filter item identifies the language the filter applies to, the name of the filter item, and the semantic tags that match the filter item. The filter items, "All Matches" and "All Words" were specified to be equivalent. This is reflected in the .ex file at section 735 where the two filter items are specified to be the same item on the filter menu. Although not illustrated, if pull-right filter items were specified in the source file type description, the filter section would reflect this by setting the "Pullright Offset" parameter of the filter item having a pullright filter to a value which identifies an offset in the file where the filter items, which are available when the pullright filter item is selected, are located.

The tags section 740 and 750 specifies each semantic tag and its weight. This section is optional in the .ex file because the semantic tags are identified in the tag set definition and is provided in the .ex file for use during debugging. Each semantic tag is identified by its name, value (also referred to as semantic tag number) and weight. The final section, the release section 760 identifies the release version for the browsing mechanism.

The tag set definition identifies each semantic tag for the language. The resulting tag set definition files generated for the languages lang1 and lang2 from the source file type description of FIG. 4 are illustrated in FIGS. 8a and 8b. Each file includes an "enum" declaration (an enum declaration is used to declare constants in the C programming language) that lists all semantic tags for the language that can be associated with symbols. Although the tag set definition is illustrated here as a file written in the C programming language, the tag set definition file is not limited as such and can be implemented in a variety of formats including a simple list of semantic tags.

Specifically, with reference to FIG. 8a, the enum declaration identifies the semantic tags for lang1, "first-on-line" and "not_first_on_line". The semantic tags are specified according to : <prefix>"_"<language name>"_"<semantic tag name>"="<semantic tag number>. It should be noted that two dummy tags "lang1_fill" and "lang1_fill" are inserted into the enum declaration to bring the total number of tags to four, the maximum number of tags specified by the Tags statement in the Source File type Description (FIG. 4). In addition, the declaration contains two additional tags, cb_lang1_tags_first_member and cb_lang1_last_member, used to delineate the beginning and end of the declaration.

Similarly, with respect to FIG. 8b, the enum delcaration identifies the semantic tags for lang2, "capitalized_word" and "not_capitalized_word" as well as two dummy tags to bring the number of semantic tags to the maximum tag size.

The tag set definition files generated by the compiler are input to the database builder to generate the database component file for an input source file. FIG. 9a illustrates a sample input source file written in the language lang1 which is simply English text having two semantic tags "cb_lang1_first_on_line" and "cb_lang1_not_first_on_line". FIG. 9b is an illustrative database builder for the language lang1 written in the C programming language. The database builder examines each symbol (in the present illustration, each word is a symbol) contained in the input source file and determines whether the symbol is the first symbol on a line of text. If it is first on a line of text, the database builder assigns to the symbol the semantic tag cb_lang1_first_on_line and puts this information in a database component file for subsequent access by the browsing mechanism for performing queries. Similarly, if the symbol is not the first symbol on a line of text in the source input file, the database builder assigns to the symbol the semantic tag cb_lang1_not_first_on_line and this information is placed in the database component file.

FIG. 9c illustrates the database component file generated for the source input file of FIG. 9a. The database component file contains a header section 800, source name section 810, symbol table section 820, semantic table section 830 and release section 840.

The header section 800 contains administrative information such as the magic number of the file (common to UNIX files) and file version numbers. The field case should be set in database component files that were generated by database builders that ignore the case of characters. The language field contains a string that is used to select the correct filter item when querying, in the present example, language lang1. The source type field indicates if the file is a top level source file or an included file. The rest of the header is a table of contents for the file where the type, size and location of all the sections are listed.

The source name section 810 contains the absolute path to the source file the database component file was built from. It also contains a bit that is set to a value of one if the path for the file was relative. This is used by the source browser when rendering file names.

The symbol table section 820 is a randomly ordered list of all the symbols described in this database component file. Each symbol carries a file relative pointer corresponding to the vector of semantic records set forth in the semantic table section 830.

The semantic table section 830 contains a vector of <line-number and semantic tag> pairs for each symbol listed in the symbol table section. Both the numeric and string value of each tag is displayed. The vectors appear in the same order as the symbols in the symbol table. Each vector is terminated by an end of vector record, "End Record". For example, the vector identified at line 1060 for the symbol "ourselves" is assigned the semantic tag cb_lang1_first_on_line because, as shown in FIG. 9a, the symbol "ourselves" is the first word on line 4 in the source input file (FIG. 9a). The vector listed in FIG. 9c at line number 1084, is the vector for the symbol "the". In all but one occurrence, the symbol identified at line 1104, which occurs at line 5 in the source input file, the symbol "the" is identified as having the semantic tag cb_lang1_not_first_on_line.

The final section, the release section 840, identifies the database system release version and date.

While the invention has been described in conjunction with the preferred embodiment, it is evident that numerous alternatives, modifications, variations and uses will be apparent to those skilled in the art in light of the foregoing description.

What is claimed is:

1. In a computer system comprising a CPU, input/output means and memory containing a file system, said file system comprising at least one source file comprising text, a user-extensible database system in which source files of different source file types can be input into the database system and queries can be performed on the source files input using the same browsing mechanism, said database system comprising:
   source file type definition which defines the language of the source file to be input to the database system, said source file type definition comprising;
   a properties statement which identifies properties of the language;
   a tags statement which identifies semantic tags of the language, said semantic tags defined according to at least one property;
   a filter statement which identifies at least one filter item for the language, said filter item defined according to at least one property;
   compiler means for compiling the source file type definition to generate a filter description and tag set definition;
   said tag set definition comprising a listing of each semantic tag for the language;
   said filter description comprising a listing of the filter items for a language, each filter item comprising a filter name, the language in which the filter is used and at least one semantic tag determined according to the properties specified by the tags statement and filter statement in the source file definition;
   database builder means to generate a database component file for a source file of a particular source file type, said database builder receiving as input the source file and the tag set definition for the source file type, said database builder comprising:
   means for identifying each symbol in the source input file;
   means for identifying the semantic tag, as set forth in the tag set definition file, for each symbol identified;
   means for storing in the database component file the symbol, the line number where the symbol occurs in the source file and the semantic tag for each symbol occurrence in the source input file;
   database browsing means for searching the database comprising at least one database component file in response to a query to find a symbol, said query identifying the symbol to search for and a filter item, said database browsing means comprising;
   means for searching a database component file for each occurrence of the symbol identified by the query;
   means for comparing the semantic tags of each occurrence of the symbol to the semantic tags specified for the filter item identified by the query;
   means for generating as a result of the query those occurrences of the symbol identified by the query which has a semantic tag which matches one of the semantic tags of the filter item identified by the query;
   whereby different types of source files can be input into the database system by providing a source file type definition and the same database browsing means is used to perform queries regardless of the input source file type.

2. The database system as set forth in claim 1, further comprising multiple database builder means, one database builder means for each language of source files.

3. The database system as set forth in claim 2, wherein a source file type definition defines a computer programming language and the database builder means is part of a computer programming language compiler.

4. The database system as set forth in claim 1, said means for searching a database component file further comprising an index file comprising a listing of each symbol and the database component file the symbol is located in, said means using the index file for searching only those database component files containing the symbol identified by the query.

5. The database system as set forth in claim 1, said filter description further comprising a menu generation means to generate a menu displaying the filter items whereby the filter items can be selected to be the filter for a query.

6. The database system as set forth in claim 1 wherein said filter description comprises a multiplicity of filter items and more than one filter item can be selected to determine the result of a query.

7. In a computer system comprising a CPU, input/output means and memory containing a file system, said file system comprising at least one source file comprising text, a user-extensible process for generating a database from source files of different source file types and performing queries on the source files input using the same browsing mechanism, said process comprising the steps of:
   creating a source file type definition which defines the language of the source file to be input to the database system, comprising the steps of;
   generating a properties statement which identifies properties of the language;
   generating a tags statement which identifies semantic tags of the language, said semantic tags defined according to at least one property;
   generating a filter statement which identifies at least one filter item for the language, said filter item defined according to at least one property;
   compiling the source file type definition to generate a filter description and tag set definition;

said tag set definition comprising a listing of each semantic tag for the language;

said filter description comprising a listing of the filter items for a language, each filter item comprising a filter name, the language in which the filter is used and at least one semantic tag determined according to the properties specified by the tags statement and filter statement in the source file definition;

building a database component file for a source file of a particular source file type, comprising the steps of:

receiving as input the source file and the tag set definition for the source file type, identifying each symbol in the source input file;

identifying the semantic tag for each symbol, said semantic tag being one of those defined in the tag set definition file;

storing in the database component file the symbol, the line number where the symbol occurs in the source file and the semantic tag for each symbol occurrence in the source input file;

searching the database comprising at least one database component file in response to a query to find a symbol, said query identifying the symbol to search for and a filter item, comprising the steps of:

searching a database component file for each occurrence of the symbol identified by the query;

comparing the semantic tag of each occurrence of the symbol to the semantic tags specified for the filter item identified by the query;

generating as a result of the query those occurrences of the symbol identified by the query which have semantic tags which match the semantic tags of the filter item identified by the query;

whereby different types of source files can be input by providing a source file type definition and queries can be performed regardless of the input source file type.

* * * * *